United States Patent [19]

Hiza et al.

[11] Patent Number: 4,923,736
[45] Date of Patent: May 8, 1990

[54] MULTI-LAYERED MICROWAVE ABSORBER AND METHOD OF MANUFACTURING THE SAME

[75] Inventors: Misao Hiza, Hiratsuka; Hajime Yamazaki, Hadano; Kazuhiro Sugihara; Tetsu So, both of Hiratsuka, all of Japan

[73] Assignee: The Yokohama Rubber Co., Ltd., Tokyo, Japan

[21] Appl. No.: 39,720

[22] Filed: Apr. 20, 1987

[30] Foreign Application Priority Data

May 14, 1986 [JP] Japan ................. 61-108634

[51] Int. Cl.$^5$ ............ B32B 77/10; B32B 9/04; B32B 7/00
[52] U.S. Cl. ...................... 428/212; 428/334; 428/447; 428/450; 219/10.55 D
[58] Field of Search ............... 219/10.55 D; 428/450, 428/212, 334, 447

[56] References Cited

U.S. PATENT DOCUMENTS

| | | | |
|---|---|---|---|
| 3,866,009 | 2/1975 | Ishino et al. | 219/10.55 D |
| 4,174,419 | 11/1979 | Nienart | 428/251 |
| 4,264,800 | 4/1981 | Jahnke et al. | 219/10.55 D |
| 4,514,585 | 4/1985 | Paynton | 219/10.55 D |
| 4,570,045 | 2/1986 | Jeppson | 219/10.55 D |
| 4,581,284 | 4/1986 | Eggert et al. | 428/402 |
| 4,602,141 | 7/1986 | Naito et al. | 219/10.55 D |
| 4,640,838 | 2/1987 | Isakson et al. | 219/10.55 E |

*Primary Examiner*—Marion C. McCamish
*Assistant Examiner*—Elizabeth M. Cole
*Attorney, Agent, or Firm*—Finnegan, Henderson, Farabow, Garrett & Dunner

[57] ABSTRACT

A multi-layered microwave absorber suitable for use in ships, aircrafts and the like comprises a plurality of layers differing in impedance which are bonded together into an integral sheet structure by a silicone-type adhesive compound applied to a coat thickness of less than 0.1 mm. The absorber is capable of wave absorption over a wide band, free from deformation or distortion, and highly heat-resistant and weather-proof. A method of manufacturing the multi-layered microwave absorber is also disclosed.

7 Claims, 2 Drawing Sheets

MULTI-LAYERED MICROWAVE ABSORBER AND METHOD OF MANUFACTURING THE SAME

BACKGROUND OF THE INVENTION

1. Field of the Invention

This invention relates to multi-layered microwave-absorptive materials for use, for example, in ships, aircrafts and other mobile structures.

2. Prior Art

Microwave-absorptive materials are broadly classified into an attenuation type in which the energy of incident wave attenuates as it passes through the absorber, and a matching type in which the amount of reflection of incident wave on the front surface of the absorber and that of reflection of wave from a reflector on the rear surface of the absorber are controlled so as to in effect eliminate the generation of reflected wave.

A typical matching-type wave absorber well known in the art comprises an absorbing layer made up of a synthetic resin or rubber sheet carrying magnetic ferrite ($Fe_2O_3$). This type of material excels of course in wave absorption, but is rather heavy, hence unsuitable for light-weight applications and furthermore structurally weak as it is a resinous or rubber sheet simply admixed with ferrite. Attempts have been made to produce a light-weight microwave absorber from a rubber composition having carbon black particles dispersed therein in place of ferrite. Such wave absorbers, however, have been effective only in handling a narrow band of microwave frequencies. It has been known that wave absorption over wide frequency bands can be achieved by the use of multi-layered absorbers, a typical example of which comprises a low impedance layer usually free of ferrite or carbon black, a high impedance layer containing substantial amounts of ferrite or carbonblack, and a reflection layer containing the same metal or fibrous carbon, these layers being laminated or otherwise bonded together in the order mentioned so that the impedance of each layer increases progressively in the direction of incidence of a microwave. Such a multilayered structure has a drawback in that, when the layers each particularly composed of a heat-resistant matrix resin, are laminated and cured simultaneously, each layer undergoes strain upon cooling to room temperature due to the pressure of considerable internal stresses resulting from the differences in the thermal coefficient of contraction between the different layers.

SUMMARY OF THE INVENTION

With the foregoing difficulties of the prior art in view, the present invention is aimed at the provision of an improved multi-layered microwave absorber which is capable of wave absorption over a wide frequency band. The composite is, free from deformation or distortion, and highly heat-resistant and weather-proof. The present invention is also aimed at providing a method of making such a multi-layered microwave are absorber.

According to the method of the invention, it is possible to manufacture a multi-layered microwave absorber which is uniform in thickness even if it is complex in shape.

These and other objects and features of the invention will be better understood from the following detailed description.

Briefly stated, the multi-layered microwave absorber according to the invention comprises a plurality of layers differing in impedance which are held together into an integral sheet structure by a silicone-type adhesive compound applied as a layer or coat having thickness of less than 0.1 mm.

The multi-layered microwave absorber according to the present invention preferably includes at least a low impedance layer of a thermosetting or thermoplastic resin free of ferroelectric and ferromagnetic material, and a reflecting layer of a metal or a carbon fiber reinforced composite material, these layers being laminated in the order mentioned.

DETAILED DESCRIPTION OF THE PREFERRED EMBODIMENT

Figure 1:
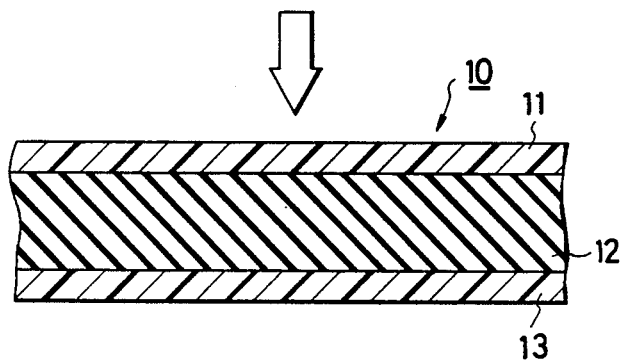
FIG. 1 is a cross-sectional view of a portion of a microwave absorber according to a first preferred embodiment of the invention.

As shown in FIG. 1, the microwave absorber 10 comprises at least three different layers, i.e., an outer surface layer 11, an absorbing layer 12, and a reflecting layer 13, which are laminated or otherwise united and in this order. The arrow indicates the direction of incidence of a microwave, and in which the impedance of the layer, increases progressively.

The outer surface layer 11 is formed of a thermosetting resin such as an epoxy resin, a silicone rubber, or thermoplastic resin, and is free of ferroelectric or ferromagnetic materials. This layer may in some instances be reinforced for structural strength with an organic fiber such as of aromatic polyamides or an inorganic fiber such as of glass.

The absorbing layer 12 is formed of a matrix resin dispersed with a ferroelectric material such as carbon black or a ferromagnetic material such as ferrite whereby its impedance increases progressively in the direction of incidence of microwaves. The layer 12 may in some instances be formed of more than one layer with varied proportions of fillers.

The reflecting layer 13 is formed of a sheet of metal or a composite sheet material reinforced with a metal or carbon fiber.

The above layers 11, 12 and 13 are laminated together with the use of a silicone-type adhesive compound which is curable at room temperature and resistant to wide temperature variations. This adhesive compound may be a one-pack type such as a de-acetic acid type, de-alcohol type, de-oxime type and de-acetone type, or a two-pack type which is catalytically curable.

The adhesive compound must be applied to infinitesimally small thicknesses and with maximum uniformity so as to eliminate any possible adverse effect on the performance of the microwave absorber. It has now been found that such critical coating thicknesses are below 0.1 mm.

The adhesive compound may be applied to adjoining surfaces of the layers 11, 12 and 13 of the absorber 10 by spraying and cured at room temperature under positive pressure by means of, for example, a vacuum bag in which the thus adhered absorber 10 is packed and disposed in a vacuum or near vacuum at room temperature for 24 hours.

The invention will be further described by way of the following examples, which are provided by way of illustration and not by way of limitation.

INVENTIVE EXAMPLE 1

An aromatic polyamide fiber cloth was impregnated with an epoxy resin and cured at 177° C. and 6.5 kg/cm$^2$ for two hours, thereby providing a low impedance layer; namely, the outer surface layer 11. To 100 parts by weight of a liquid silicone rubber was added dispersively 40 parts by weight of a particulate carbon black, the whole being cured to provide a high impedance intermediate layer; namely, the absorbing layer 12. A carbon fiber cloth was impregnated with an epoxy resin and cured in a manner similar to the outer surface layer 11 to provide an inner surface; namely, the reflecting layer 13. These three layers were laminated and applied with the use of RTV silicone spray of Fine Chemicals Japan Ltd. and packed in a vacuum bag for 10 hours to be cured and set into an integral sheet structure. No warp or other distortion was found in any of the individual layers. The adhesive spray was applied to a thickness of 0.075 mm. The resulting sheet structure was tested for its absorption performance, which was substantially comparable to a non-bonded counterpart control.

Figure 2:
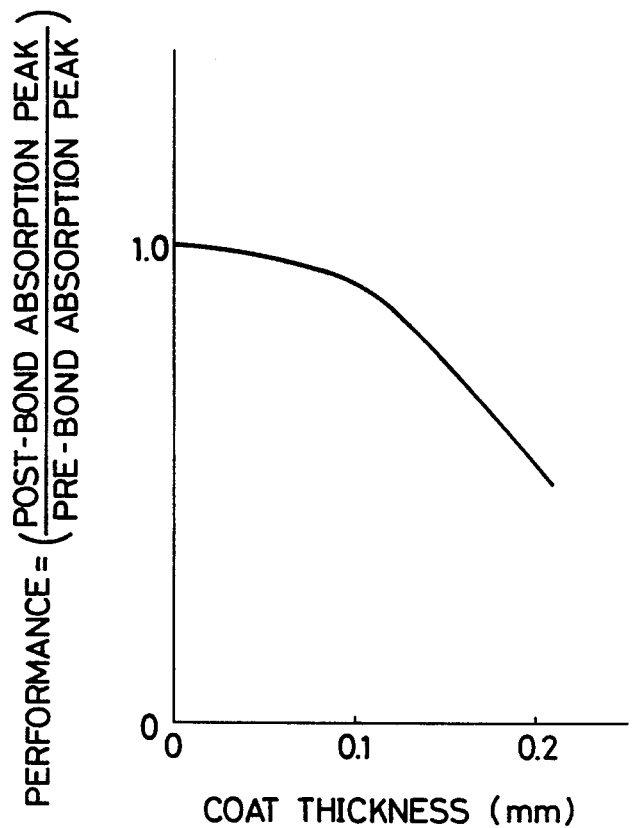
FIG. 2 is a graphical representation of the performance characteristics of the absorber as shown in FIG. 1.

FIG. 2 graphically shows microwave absorbing performance plotted against adhesive coat thickness, from which it will be seen that the absorbing ability of the absorber peak at 1.0 declines sharply with coat thickness exceeding 0.1 mm.

Figure 3:
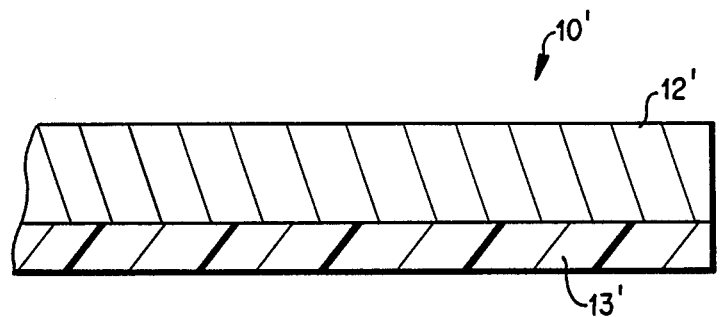
FIG. 3 is a cross-sectional view of a portion of a microwave absorber according to a second preferred embodiment of the invention.

It will be recognized by those of ordinary skill in the art that the scope of the present invention is not limited to the specific embodiment described above. For example, a two-layered microwave absorber 10' according to the invention may be constructed as described above for the three-layered absorber but in which the outer layer 11 is omitted, as shown in FIG. 3.

COMPARATIVE EXAMPLE 1

The three layers as prepared in Inventive Example 1 were bonded together by brush coating of a room temperature curable silicone adhesive (tradenamed KE-66 of Shinetsu Chemical Industry Co.) diluted with 2-butanone to a 20% solution, and were cured as per Inventive Example 1. The adhesive coat was 0.125 mm thick. The wave absorbing performance was poor, with the absorption peak shifted more than 2 GHz as compared with a non-bonded counterpart.

COMPARATIVE EXAMPLE 2

The outer surface or low impedance layer 11 and the inner surface or reflecting layer 13 were prepared by the procedure of Inventive Example 1. The absorbing or high impedance layer 12 was prepared from an admixture of 40 wt. parts of an epoxy resin (tradenamed TETRAD X of Mitsubishi Gas Chemical Co.) 60 wt. parts of an anhydrous acid (tradenamed MHAC-P of Hitachi Chemical Co.,) and 30 wt. parts of a particulate carbon black. The admixture was press-cured at 150° C., the three layers of which were then bonded together with an adhesive compound comprising 100 wt. parts of an epoxy resin (tradenamed ELM 434 of Sumitomo Chemical Co.) and 40 wt. parts of p-diaminodiphenyl methane and press-cured at 150° C. for one hour. The resulting composite sheet was warped over its entirety when cooled to room temperature. The high impedance layer 12 in particular was found cracked.

INVENTIVE EXAMPLE 2

An aromatic polyamide fiber cloth was impregnated with a resin chiefly including bismaleimide-triazine resin (tradenamed BT 2160, manufactured by Mitsubishi Gas Chemical Co.) and cured at 177° C. and 6.5 kg/cm$^2$ for two hours, thereby providing a low impedance layer, i.e., the outer surface layer 11, as in Inventive Example 1. To 100 parts by weight of a liquid silicone rubber was added dispersively 40 parts by weight of a particulate carbon black, the whole being cured to provide a high impedance intermediate layer: namely, the absorbing layer 12. A carbon fiber cloth was impregnated with an epoxy resin and cured in a manner similar to the outer surface layer 11 to provide an inner surface; namely, the reflecting layer 13. These three layers were laminated and applied with the use of RTV silicone spray of Fine Chemicals Japan Ltd. and packed in a vacuum bag for 10 hours to be cured and set into an integral sheet structure. The adhesive spray was applied to a thickness of 0.075 mm. The resulting sheet structure was found to be free from warp or other distortion in any of the individual layers.

INVENTIVE EXAMPLE 3

A glass fiber cloth was impregnated with an epoxy resin and cured at 177° C. and 6.5 kg/cm$^2$ for two hours, thereby providing a low impedance layer, i.e., the outer surface layer 11, as in Inventive Example 1. To 100 parts by weight of a liquid silicone rubber was added dispersively 40 parts by weight of a particulate carbon black, the whole being cured to provide a high impedance intermediate layer; namely, the absorbing layer 12. A carbon fiber cloth was impregnated with an epoxy resin and cured in a manner similar to the outer surface layer 11 to provide an inner surface; namely, the reflecting layer 13. These three layers were laminated and applied with the use of RTV silicone spray of Fine Chemicals Japan Ltd. and packed in a vacuum bag for 10 hours to be cured and set into an integral sheet structure. The adhesive spray was applied to a thickness of 0.075 mm. The resulting sheet structure was found to be free from warp or other distortion in any of the individual layers.

Many changes and modifications may be made in the specific embodiments described above as may appear obvious to one skilled in the art without departing from the scope of the appended claims.

What is claimed is:

1. A multi-layered microwave absorber comprising a plurality of layers differing in impedance from one another which are bonded together into an integral sheet structure by a silicone adhesive compound between said layers with a coat thickness of less than 0.1 mm, said layers including at least a low impedance layer having a resinous material free of ferroelectric and ferromagnetic materials, and a reflecting layer, said layers being laminated in the order mentioned.

2. A multi-layered microwave absorber according to claim 1, wherein said resinous material of said low impedance layer comprises at least one of a thermosetting resin and a thermoplastic resin.

3. A multi-layered microwave absorber according to claim 1, wherein said reflecting layer comprises at least one of a metal and a carbon fiber reinforced composite material.

4. A multi-layered microwave absorber according to claim 1, wherein said layers comprise a first layer formed from a resinous material free of ferroelectric and ferromagnetic materials and having a first impedance, and a reflecting layer for reflecting microwave energy, said first and reflecting layers being laminated together.

5. A multi-layered microwave absorber according to claim 4, further including a second layer of a resinous material dispersed with a nonferrous material and having a second impedance greater than the first impedance, said second layer being interposed between said first layer and said reflecting layer.

6. A multi-layered microwave absorber according to claim 4, wherein the resinous material of said first layer includes at least one of a thermosetting resin, a thermoplastic resin, an organic fiber reinforced composite material, and an inorganic fiber reinforced composite material.

7. A multi-layered microwave absorber according to claim 4, wherein the resinous material of said second layer includes a matrix resin.

* * * * *